United States Patent
Hilborn et al.

(10) Patent No.: US 6,543,303 B1
(45) Date of Patent: Apr. 8, 2003

(54) PRESSURE-RETAINING DISK

(76) Inventors: Howard Hilborn, 1503 Lake Bank Ct., El Lago, TX (US) 77586; Dale Dutcher, 6227 Denmark, Pasadena, TX (US) 77505

(*) Notice: Subject to any disclaimer, the term of this patent is extended or adjusted under 35 U.S.C. 154(b) by 87 days.

(21) Appl. No.: 09/680,606

(22) Filed: Oct. 6, 2000

(51) Int. Cl.$^7$ .............................................. G01D 21/00
(52) U.S. Cl. ................................................... 73/866.5
(58) Field of Search ..................... 73/866.5; 277/318, 277/319; 374/143, 208

(56) References Cited

U.S. PATENT DOCUMENTS

| | | | |
|---|---|---|---|
| 3,781,453 A | * 12/1973 | Funk et al. | 174/11 R |
| 4,064,756 A | 12/1977 | Maclean et al. | 73/349 |
| 4,168,394 A | * 9/1979 | Yuey | 174/151 |
| 4,376,227 A | 3/1983 | Hilborn | 136/242 |
| 4,653,935 A | 3/1987 | Daily et al. | 374/208 |
| 4,822,570 A | 4/1989 | Lerman et al. | 422/119 |
| 4,848,927 A | 7/1989 | Daily et al. | 374/208 |
| 5,232,517 A | * 8/1993 | Hilborn et al. | 136/233 |
| 5,450,765 A | * 9/1995 | Stover | 73/866.5 |
| 5,835,546 A | 11/1998 | Stapleton | 376/203 |
| 6,053,632 A | * 4/2000 | Leininger | 374/130 |

OTHER PUBLICATIONS

Adachi et al., US Patent Application US 20020061049A1, May 23, 2002.*

* cited by examiner

*Primary Examiner*—Daniel S. Larkin
*Assistant Examiner*—C D Garber
(74) *Attorney, Agent, or Firm*—Bracewell & Patterson LLP

(57) ABSTRACT

A pressure-retaining disk receives a plurality of sensors, the disk of the pressure-retaining disk having a plurality of sensor-receiving bores for receiving the sensors. These bores are connected by a passage. The disk is part of an apparatus that sealingly closes an entry or opening to a pressure vessel. The apparatus or sensor assembly allows for passing a plurality of sensors at least partially into the vessel through the opening in the vessel. The apparatus includes means for mounting the disk to the vessel, such means can include a tubular body through which the sensors pass. The pressure-retaining disk is connected to one end of the mounting means such that pressure of the vessel is retained. The sensors pass through the bores in the pressure-retaining disk and the bores or opening in the mounting means.

16 Claims, 9 Drawing Sheets

PRESSURE-RETAINING DISK

BACKGROUND OF THE INVENTION

1. Field of the Invention

The present invention relates generally to a pressure-retaining disk for use in an apparatus to penetrate into a pressure vessel for purposes of introducing sensors.

2. Description of Prior Art

Thermocouples are typically used to measure temperature within reactors or other vessels. The introduction of the thermocouples or other sensor devices into the vessel requires an assembly that is attached or coupled to the vessel such that the sensors are encapsulated within a sensor assembly that allows the sensors to penetrate into the interior of the vessel. The sensors exit the vessel or the sensor well to an instrumentation junction box containing electrical terminals for transmitting the temperature signal of the thermocouples or signal related to any other property to be measured by the sensor. Commonly, multiple thermocouples are used to allow for placement at different locations within the vessel. The term sensor is used throughout in its broadest sense to indicate thermocouples and other sensing devices. Specific references to thermocouples are understood to apply to other sensing devices as well.

For operational as well as safety reasons, it is necessary to create a pressure seal to prevent pressure escape in the area where the sensor leads exit the vessel and enter the instrument junction box. For example, it is necessary to create a high pressure primary seal so that fluid or gas from the vessel does not escape. The secondary seal acts to give a second layer of defense should a problem occur and it provides a warning of primary seal loss. Multi-holed plates or disks, such as the thermocouple seal disclosed in U.S. Pat. No. 4,376,227 issued to Hilborn, are used for this purpose. Sensors are passed through the holes of the disk and brazed or welded to the shields extending through the disk.

U.S. Pat. No. 5,232,517 also issued to Hilborn discloses a multipoint sensor assembly for measuring temperature at a large number of discrete locations within a vessel. Multiple sensors enter the vessel through a pressure-retaining multi-holed disk.

U.S. Pat. No. 5,775,807 issued to Dutcher discloses an apparatus for maximizing multi-tubular penetration of a pressure vessel allowing the introduction of multiple sensors. The sensor cables are secured to multi-holed pressure-retainer disks. The apparatus includes a first pressure-retaining disk that forms a primary chamber between the disk and the flange which provides a separation area for the temperature measurement cables. A second pressure-retaining disk creates a secondary chamber between the first and second pressure-retaining disks. The second pressure-retaining disk closes the other end of the tubular sensor apparatus. The temperature measurement cables extend at one end into the pressure vessel and at the other end through aligned holes in the disks and to instrumentation. Each sensor is welded to one face of each disk. Pressure taps can be utilized attached to the first and/or second chamber. An option pressure tap into the primary chamber allows the operator to determine the pressure of the vessel since it is always under pressure while the vessel is operation. Another means of gathering this pressure reading is through an additional opening in the vessel, additional openings being undesirable.

While the thermocouple seal described above and the apparatus described in the '807 patent has been quite successful, it is desirable to create a sensor assembly that maximizes pressure retention while minimizing the space required for the apparatus. Thus, it is an object of the invention to create a pressure disk that allows for a minimization of size and weight of a sensor assembly. Likewise, it is an object to lower material costs of a sensor assembly. It is a further object of the invention to maximize the allowable pressure rating for a sensor assembly.

It is a further object of the invention to create a disk that not only permits the passage of temperature measurement devices but also permits the monitoring of pressure.

It is an object of the invention to create a pressure-retaining disk that not only creates a seal to make a primary pressure chamber, but also acts as a self-contained secondary pressure chamber.

It is an object of the invention to create a pressure-retaining disk that allows the venting of pressure build-up.

It is an object of the invention to reduce the number of weld splices required, as compared to previous assembly designs, to reduce the number of potential leak points.

It is an object of the invention to lower inspection and pressure testing costs. It is a further object of the invention to lower manufacturing costs.

It is an object of the invention to minimize the possibility of assembly error such as misalignment of pass-through bores in a multi-disk chamber design.

It is an object of the invention to provide a pressure tap connection integral to the pressure-retaining disk.

BRIEF SUMMARY OF THE INVENTION

The current invention, which addresses one or more of the above objects, includes a sealing device which includes a pressure-retaining disk for use with a sensor assembly. The pressure-retaining disk receives a plurality of sensor leads, the disk having a plurality of sensor-receiving bores for receiving the sensor leads. These bores are connected by a passage. The passage between the bores creates a network where the pressure in the bores and the passage are equalized. Thus, a pressure reading at any point in the network, whether it is a bore or a passage, is effectively the same.

The pressure-retaining disk has an inner surface that is exposed to the pressure of the vessel. The disk also has an outer surface which is the rest of the surface area, such area being unexposed to the pressure of the vessel. A preferred embodiment includes an aperture in the disk between the network and the outer surface of the pressure-retaining disk. In this manner, a pressure-measuring device can be used in conjunction with the aperture to monitor the pressure. This aperture thus allows for the indication of a loss of a primary seal or of hydrogen migration. The aperture can also be used as a means for venting pressure build-up.

In one embodiment of the invention, the passage is non-perpendicular to the bores which the passage connects thus creating an angled connection.

The pressure-retaining disk includes tube means fixed to the disk generally aligning with at least a plurality of the sensor-receiving bores. The tubes or other tube means receive the sensors which pass through the bores. While the tubes can also include openings that align with the bores, a preferred embodiment includes attaching the tubes to the surfaces of the disk such that the tube extends from a first face of the disk with a corresponding tube extending from a second face of the disk in alignment with the same bore. When the tube means is a sheath for the sensor, it is the tube means that is connected to the disk and the sheath can extend all the way into the reactor. In such situation, the sheath passes through though the bore without an opening in the sheath aligning with passage as the invention allows monitoring of the equalized pressure in the bores through which the sheaths pass.

The pressure-retaining disk is part of an apparatus that sealingly closes an entry to a pressure vessel where the pressure vessel includes a sensor assembly for passing a plurality of sensors at least partially into the vessel through an opening in the vessel. Again, tubes can be fixed to the disk through the bores for receiving the sensors when desired. The apparatus includes means for mounting the pressure-retaining disk to the vessel at the opening in the vessel. In one embodiment, the pressure-retaining disk described above connects directly to the mounting means. The mounting means can be any traditional or non-traditional sealing method. Examples include a flange, such as a standard flange including a circle of bolt holes compatible with a like circle of holes carried by a nozzle of the vessel, the nozzle providing the opening in the vessel. The flange may include a tubular bore through the flange or individual bores for receiving the sensors or other configurations. An example of a non-traditional sealing method includes a proprietary fitting attached to the vessel.

Another embodiment of the mounting means useful in the apparatus includes a tubular body with an opening through it and fastener means. In this situation, fastener means includes any type of sealing method as described above with the tubular body attached thereto. The sensors pass through the bore in the pressure-retaining disk into and through the tubular body. The sensors are introduced into the vessel through the opening of the tubular body and the fastener means. The tubular body has a first end located adjacent to the fastener means or, with some proprietary fasteners, within the vessel. A second end of the tubular body is connected to the pressure-retaining disk such that pressure of the vessel is retained within the tubular body. When this configuration is used, the tubular body is at least partially located between the disk and the fastener means. The tubular body can be of cylindrical shape or of some other shape such that the opening in the tubular body creates a channel through which the sensors can pass. A common configuration includes a tubular body that changes diameters along its length or "necks down."

Figure 1:
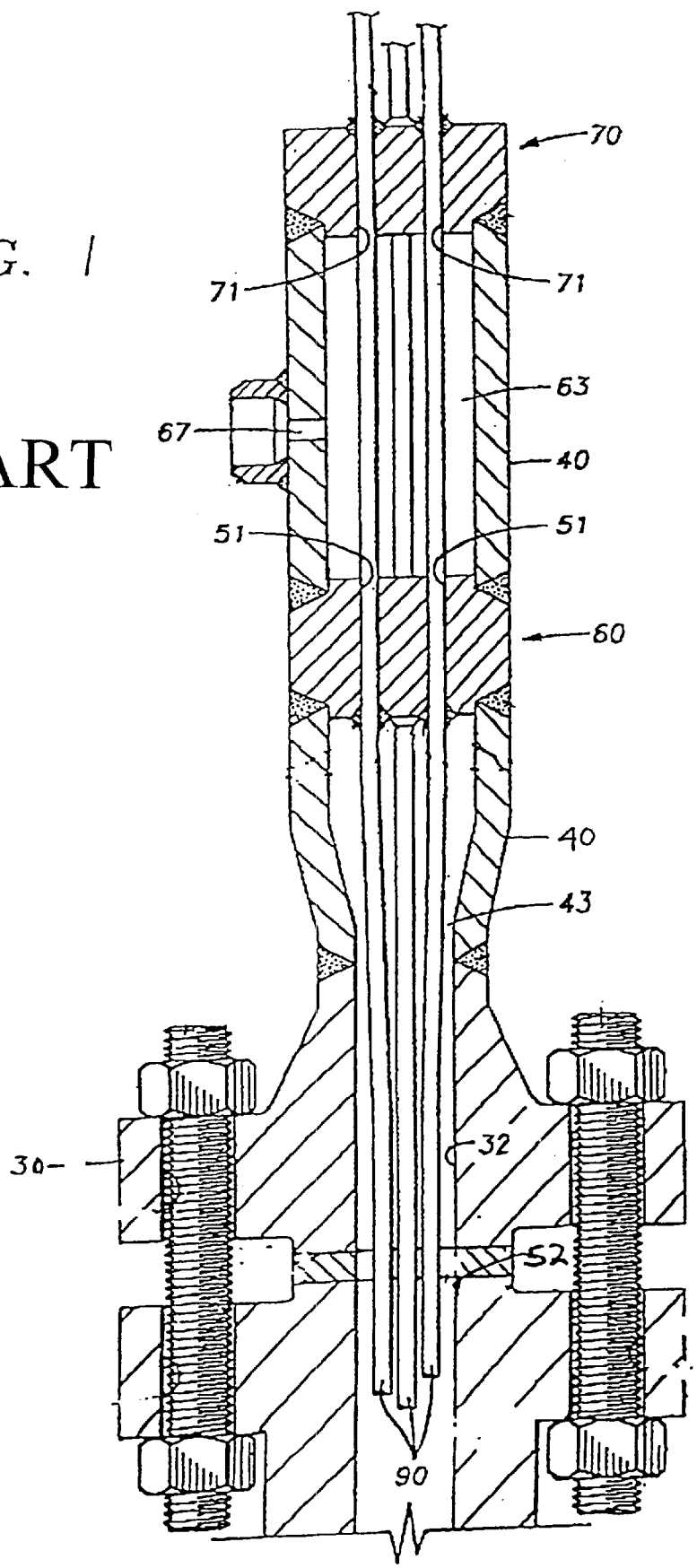
FIG. 1 is the prior art apparatus including a primary and secondary chamber defined by two pressure-retaining disks of previous design and the flange.

So that the manner in which the above-recited features, advantages and objectives of the invention, as well as others which will become apparent, are attained and can be understood in detail, more particular description of the invention briefly summarized above may be had by reference to the embodiments thereof which are illustrated in the drawings, which drawings form a part of this specification. It is to be noted, however, that the appended drawings illustrate only preferred embodiments of the invention and are, therefore, not to be considered limiting of the invention's scope, for the invention may admit to other equally effective embodiments.

DETAILED DESCRIPTION OF THE INVENTION

FIG. 1 demonstrates the prior art configuration, such as that found in U.S. Pat. No. 5,775,807. This configurations has a first and second pressure retaining disk 60, 70. The disks include bores 51, 71 for receiving sensors. The sensors pass through tubular member 40. A primary chamber 43 is formed between flange 30 and first pressure-retaining disk 60. A secondary chamber 63 is formed between the first pressure retaining disk 60 and the second pressure retaining disk 70. An opening 67 in the secondary chamber is used as a pressure tap. The disks shown in the prior art FIG. 1 have no interconnecting passage between the bores.

Figure 2:
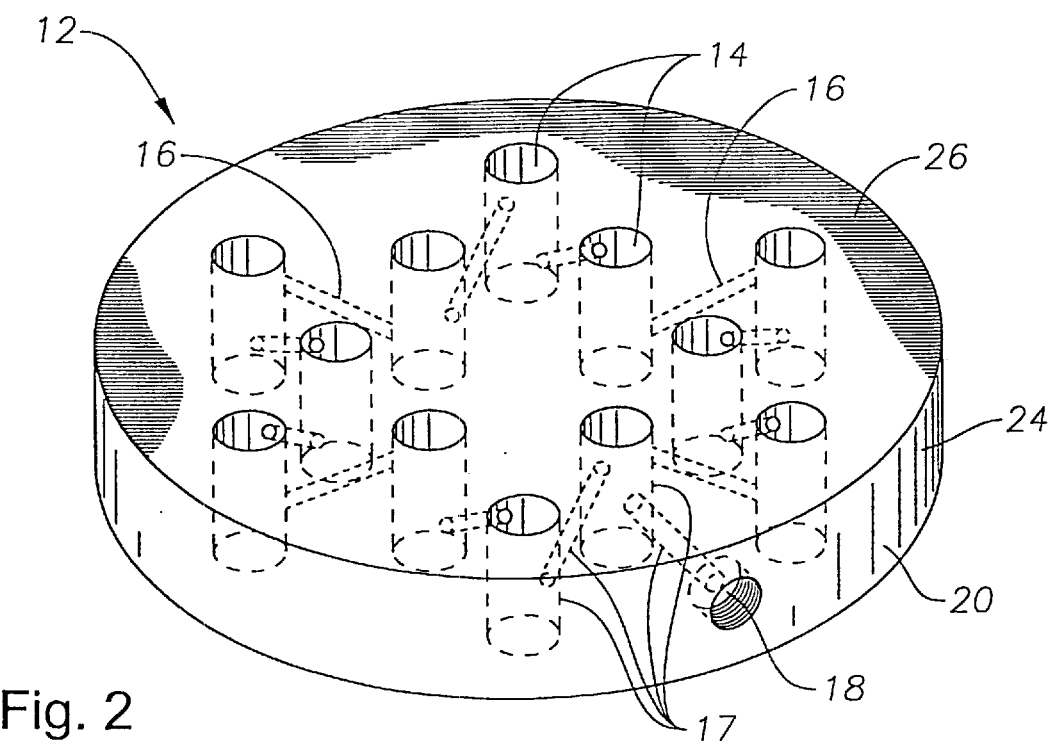
FIG. 2 is a schematic of an orthogonal view of the pressure-retaining disk of the current invention.

FIG. 2 shows the pressure-retaining disk 12 of the current invention. The disk 12 is typically a solid piece of metal machined into the configuration of the invention. Disk 12 can be manufactured in a variety of manners. Multiple bores 14 extend through the disk. Theses bores allow sensors to pass through the pressure retaining disk. The bores are connected by passage 16. Those bores which are interconnected by passage 16 have equalized pressure. This allows for a uniform pressure reading and it also provides a method of venting pressure build-up. As the passage and the bores interconnect to provide this uniform pressure, the pressure can be measured from any point of a network 17 that includes the bores and passage. FIG. 2 demonstrates an aperture 18 in an outer surface 20. The disk includes an inner surface 22 which is exposed to pressure from a vessel. The outer surface 20 includes both an outer edge 24 and an outer face 26. The aperture 18 is connected to the network 17 and can be located anywhere on the outer surface for convenience of determining pressure or venting.

Figure 3:
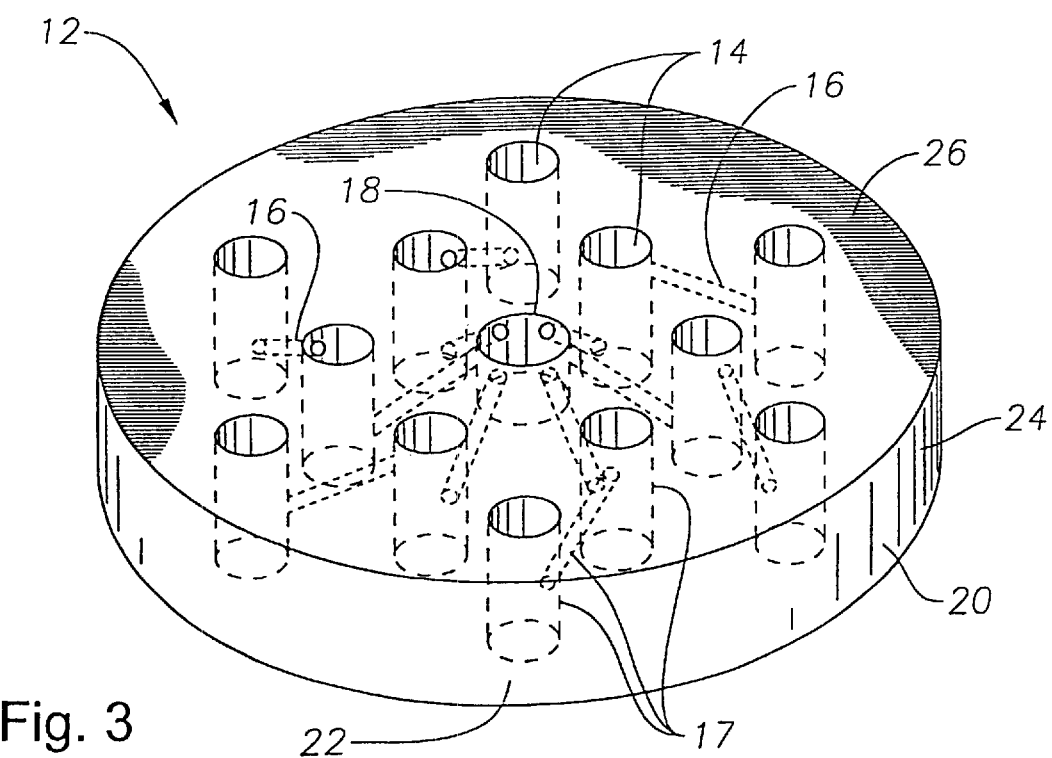
FIG. 3 shows an alternate configuration of the pressure-retaining disk.

FIG. 3 shows an alternate configuration of the pressure-retaining disk. The network 17 of bores 14 and passages 16 is configured in a different pattern. Many patterns can be used to achieve the same goals. FIG. 3 demonstrates a pattern that resembles a spoke pattern. Any pattern of interconnected bores is acceptable.

Figure 4:
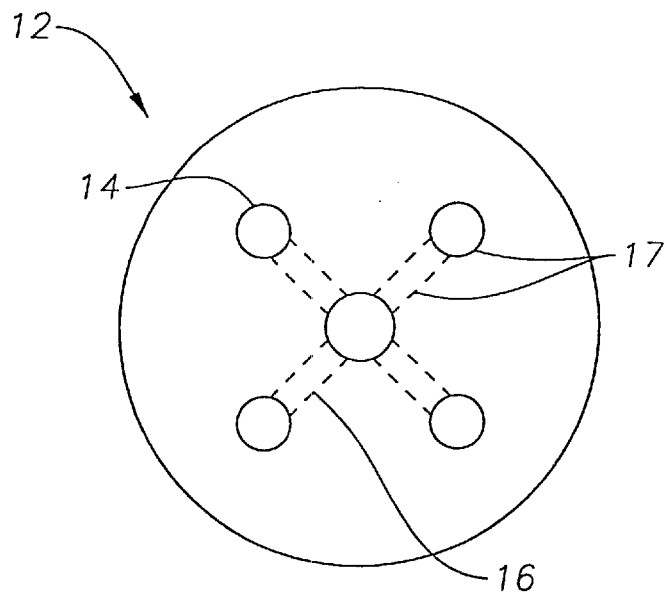
FIG. 4 shows the plan view of the pressure-retaining disk of the current invention showing a disk with sensor-receiving bores.

FIG. 4 shows the overhead view of the pressure-retaining disk 12 of the current invention showing the disk 12 with sensor-receiving bores 14. Passage 16 in the interior of disk 12 connects bores 14 to form the network 17.

FIG. 5 demonstrate several different embodiments of the apparatus of the current invention. FIG. 5A demonstrates the disk 12 attached to means for mounting the disk to the vessel at the opening. In this case, the mounting means 33 is weld neck flange 30. Sensors 90 extend through bores 14. FIG. 5A shows the mounting means attached to disk 12 by weld 44. This type of flange includes a tubular opening 46 allowing the sensors 90 to pass into the vessel. Pressure device, typically in sheath 48, is used to monitor and vent pressure.

Figure 5A:
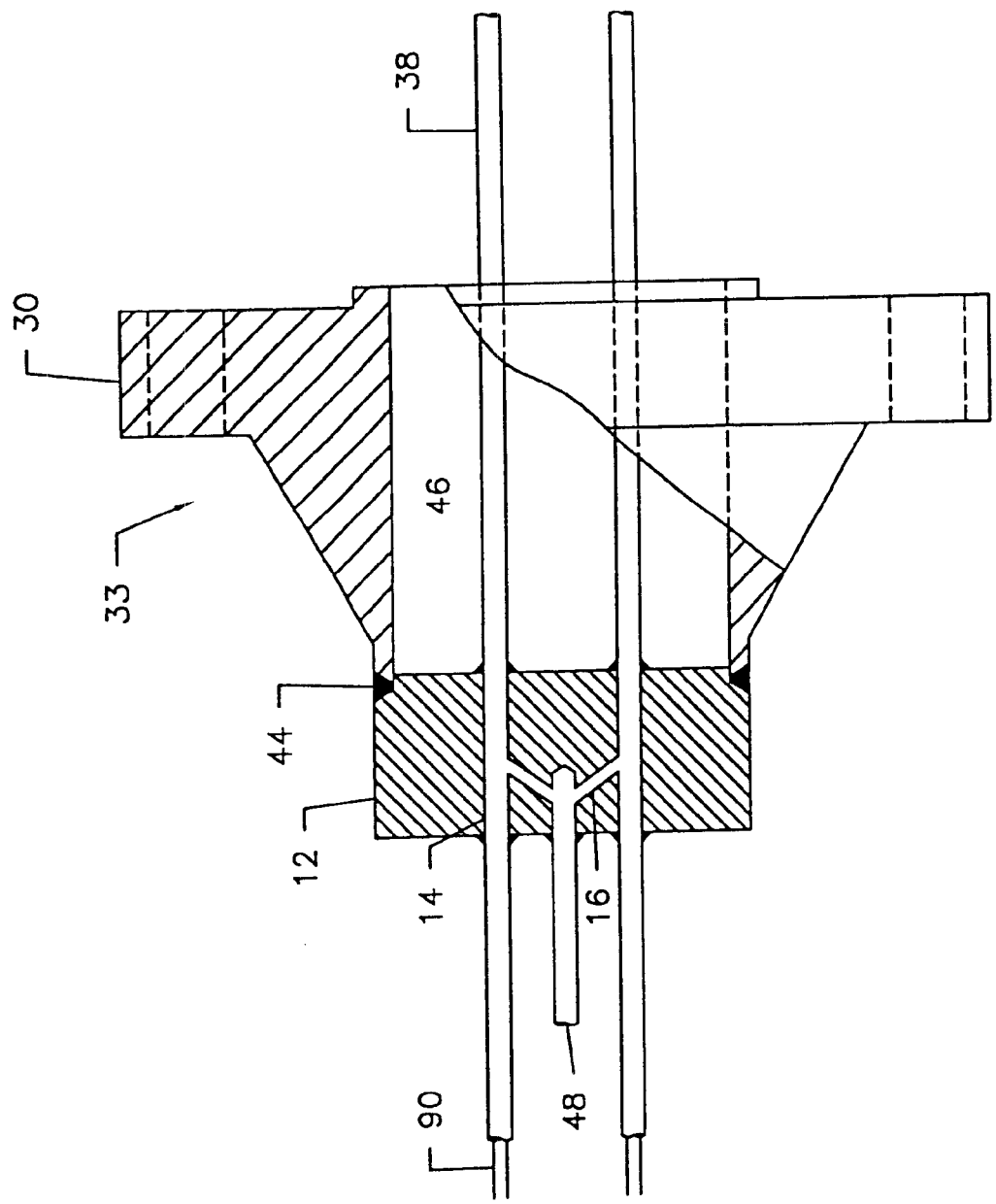
FIGS. 5A, 5B, 5C, 5D, 5E and 5F are schematics of various embodiments of the apparatus of the current invention utilizing the pressure-retaining disk of the invention.
Figure 5B:
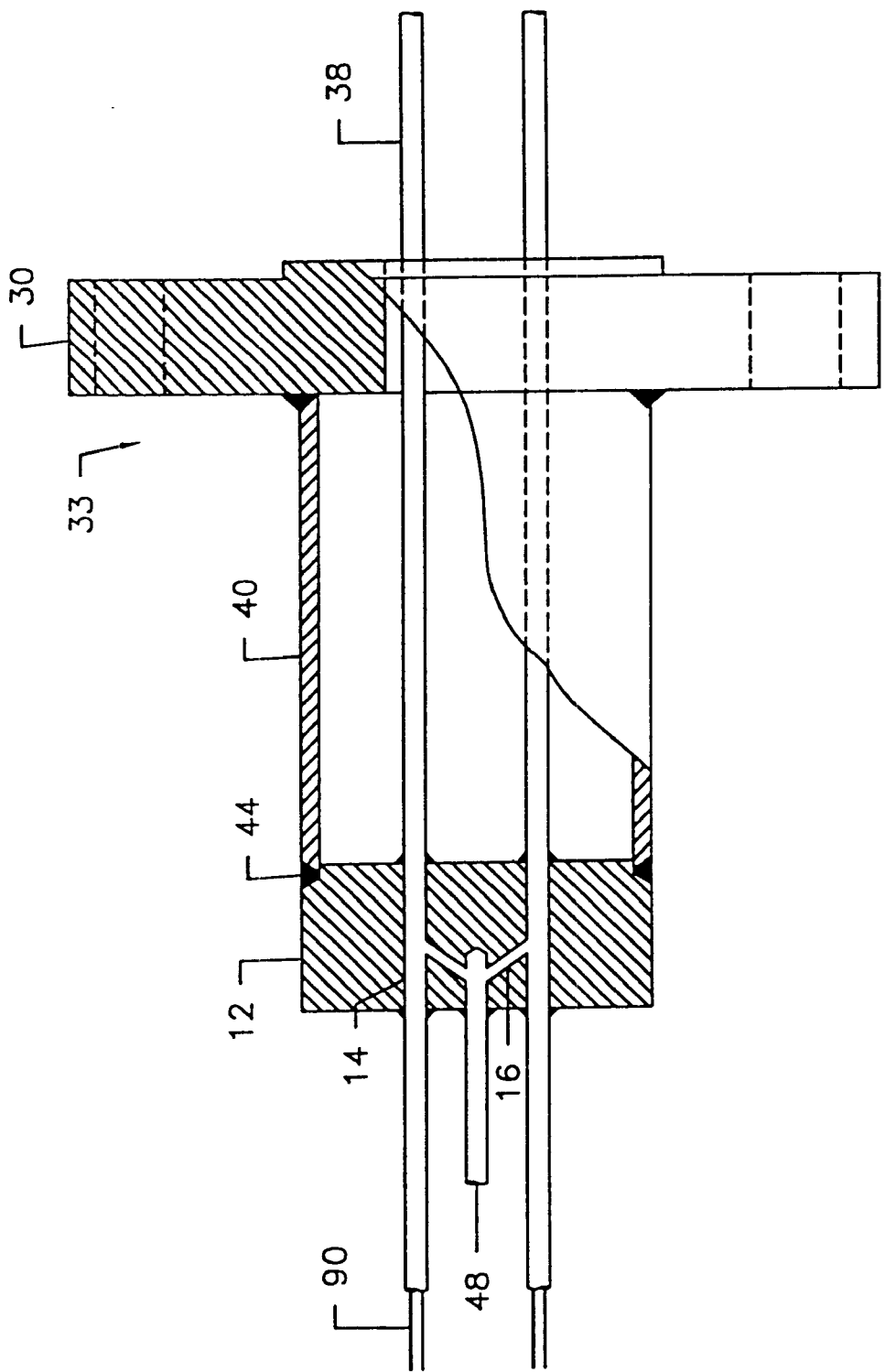

FIG. 5B depicts an alternate embodiment where the means for mounting the disk includes tubular body 40 and flange 30. A blind flange is shown with an opening to allow the passage of sensors 90. This figure shows sheaths for removably receiving the sensors 90. The tubular body is cylindrical in shape, although an alternate embodiment would include a tubular body that necks down.

Figure 5C:
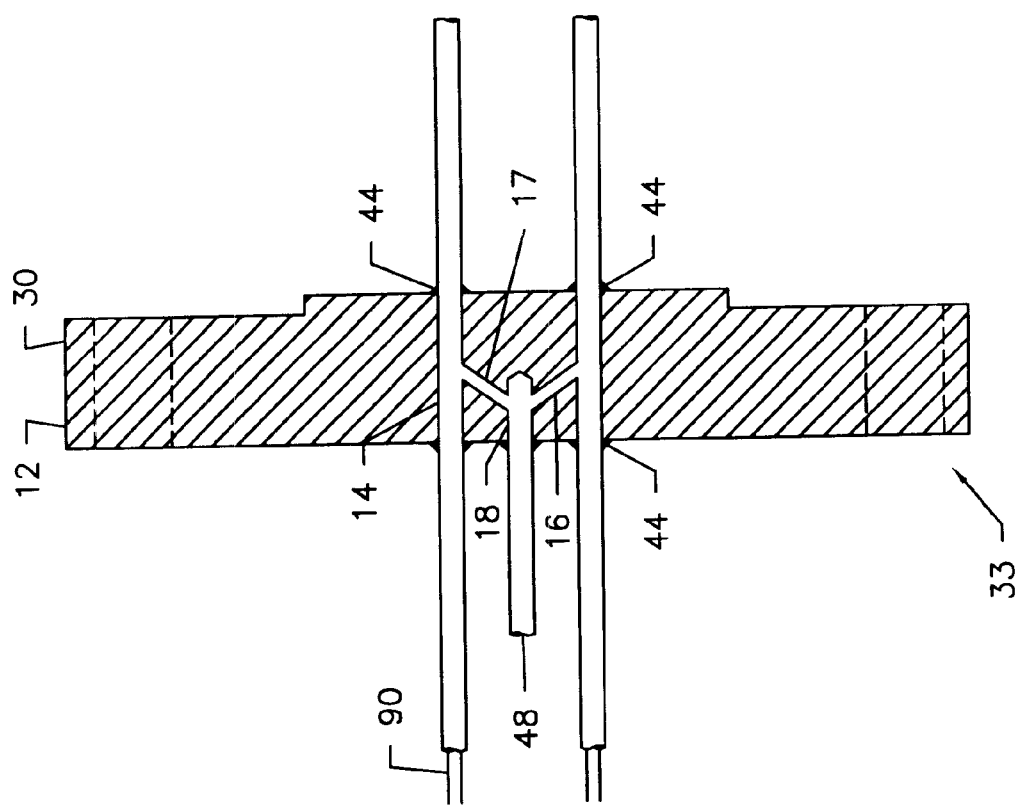

FIG. 5C shows the pressure retaining-disk as an integral part of the mounting means. Thus, the two elements are not required to be separate elements. In FIG. 5C, a blind flange is drilled with bores 14 and passage 16 to create network 17. Aperture 18 allows for access by sheath 48 for pressure device. Tube means 38, in this case sheaths, extend through bores 14. The sheaths are welded to the pressure-retaining disk at 44. A sheath 48 is also utilized with pressure device in this embodiment.

Figure 5D:
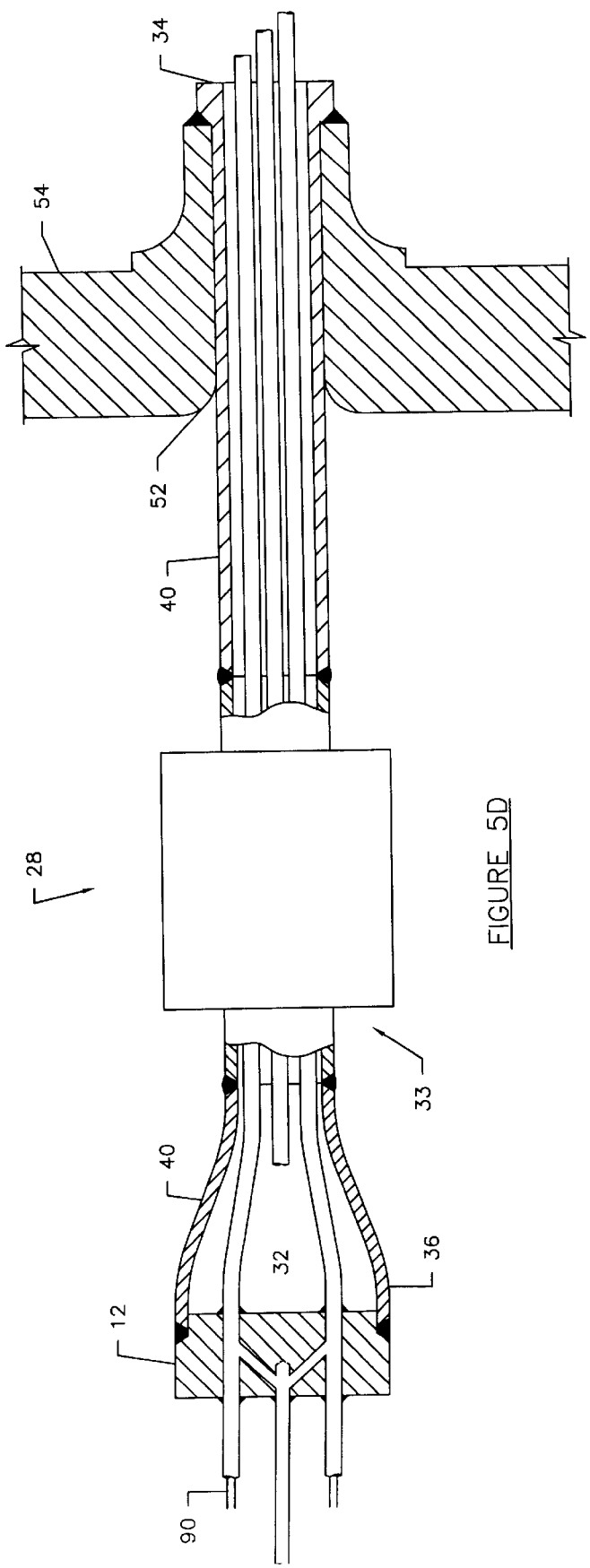

FIG. 5D depicts an alternate embodiment of the apparatus of the invention. Pressure retaining disk 12 is connected to the means for mounting which includes a tubular body 40 which has a necked down configuration. This figure depicts a piping expander attachment to any pressure connection. The tubular body in this configuration extends into the pressure vessel carrying the sheathed sensors, as opposed to alternate configurations where only the sheathed sensors enter the vessel. This sensor assembly 28 sealingly closes entry or opening 52 to pressure vessel 54. The assembly 28 can be mounted to a vessel nozzle or other opening 30 in a traditional fashion, such as that shown in FIG. 1. Sensors 90 extend at least partially into the vessel through the vessel opening or entry 52.

The assembly 28 includes tubular body 40 with an opening 32 through which the plurality of sensors 90 are introduced into the vessel. The tubular body has a first end 34 located within the vessel and a second end 36 located at least at the exterior of the vessel. The pressure-retaining disk 12 is dimensioned so as to close the opening 32 of the tubular body at the second end 36. As described above, the disk has a plurality of sensor-receiving bores 14 therethrough. The bores 14 are interconnected by passage 16.

Figure 5E:
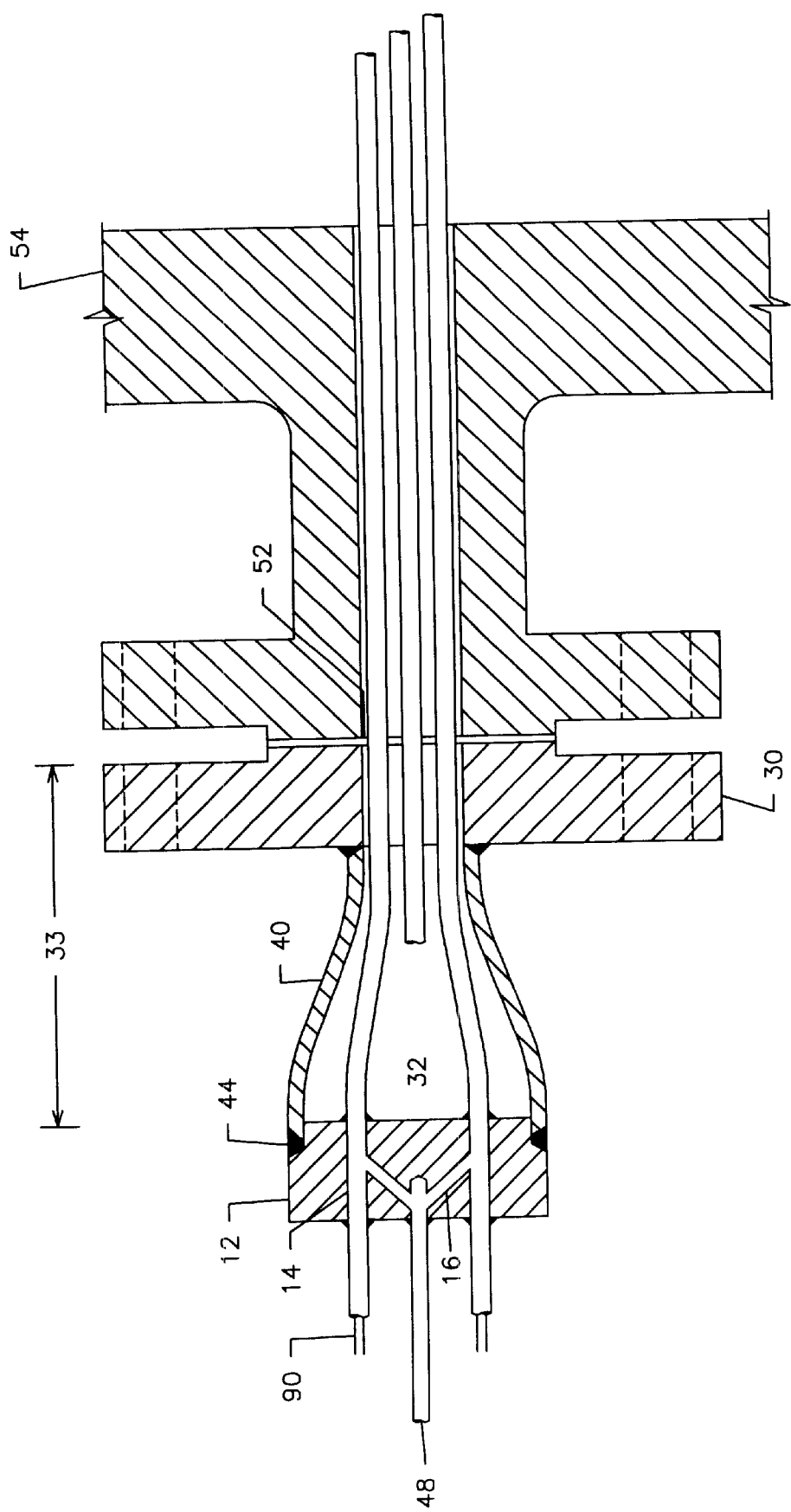
Figure 5F:
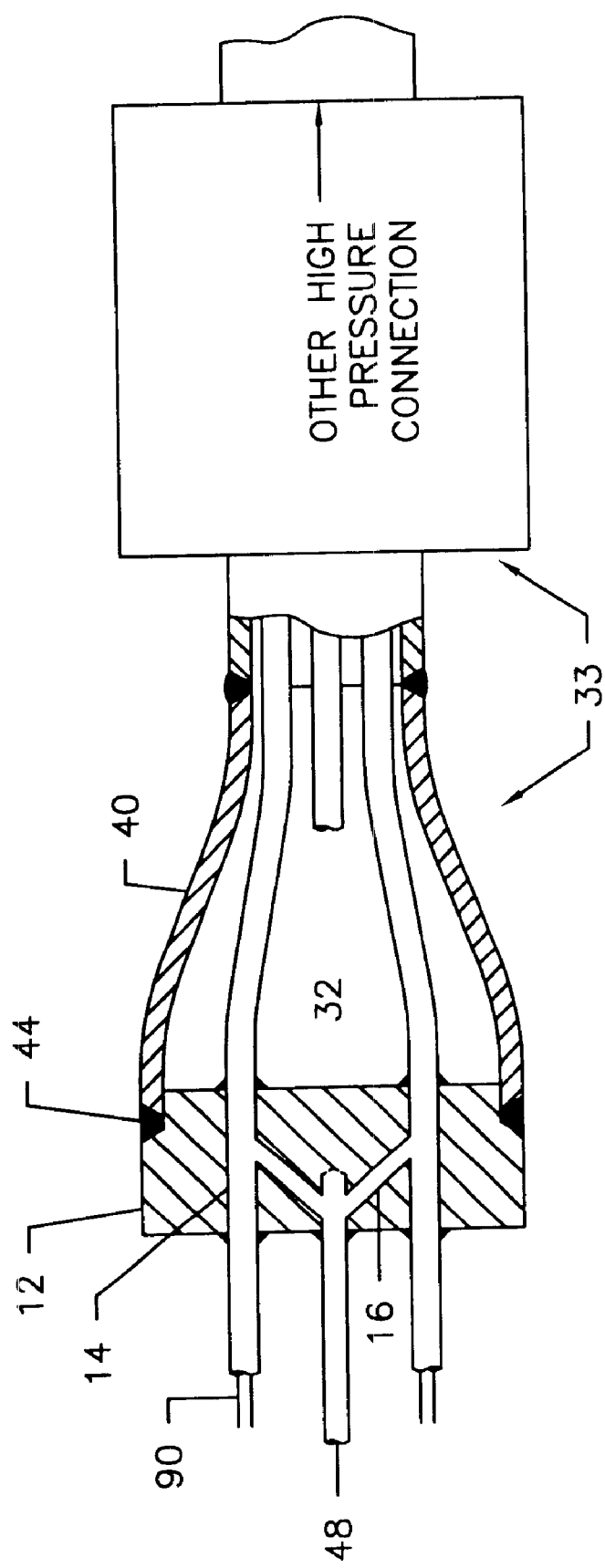

FIG. 5E shows an exemplary piping expander attachment for mating with any flange connection such as an externally mounted flange nozzle. In this configuration, the means for mounting pressure-retaining disk 12 to the vessel 54 at the opening in the vessel includes tubular body 40 and fastener means located at the opening to the vessel. The fastener means in this figure is a flange 30 with tubular opening 32 therethrough. The flange aligns with the flange connection at the opening 52 of the pressure vessel 54. Sheathed sensors 90 pass through the bores of the pressure-retaining disk, through the tubular body with the flange and into the pressure vessel through the flange at the opening. The sensors are inserted through or contained within the sheaths. The pressure-retaining disk includes bores 14 for the sensors and passage 16. FIG. 5F shows a similar configuration for use with any pressure connection. Again, the pressure-retaining disk as described above is shown.

Figure 6:
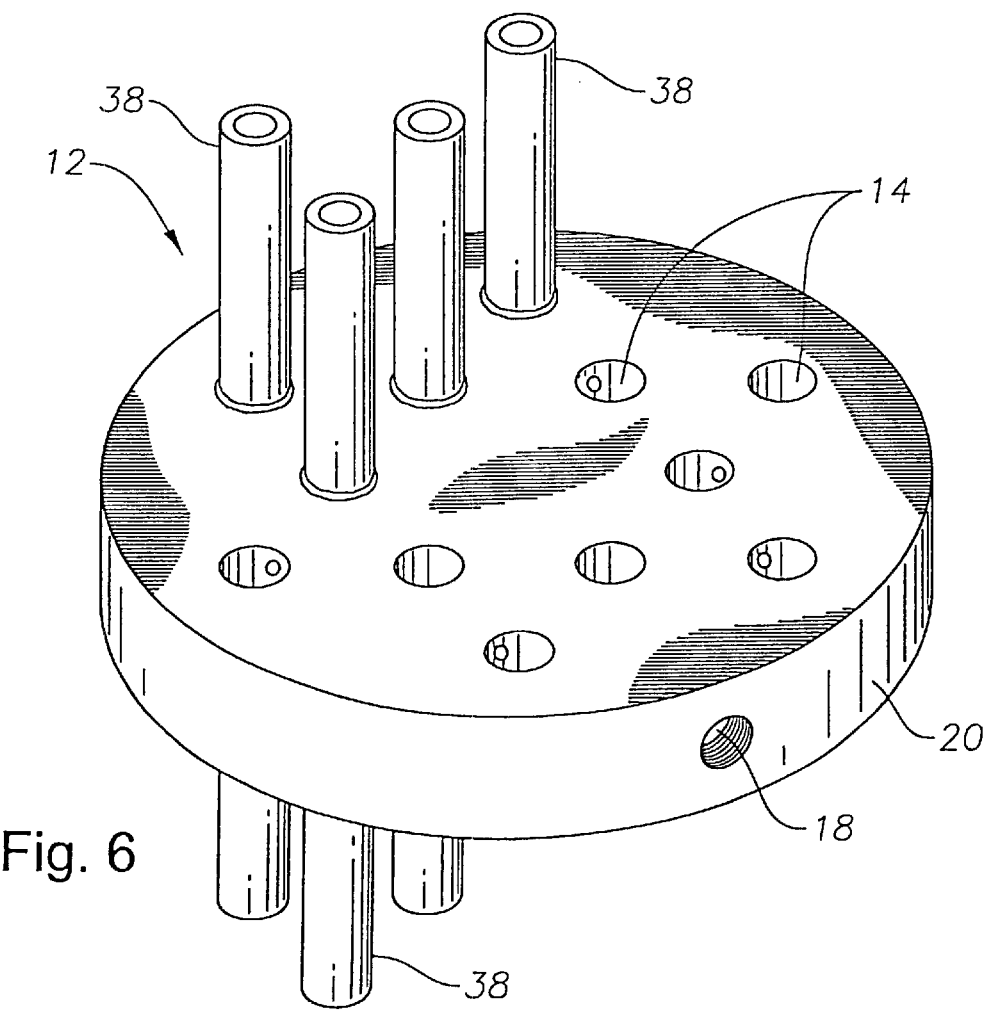
FIG. 6 shows the pressure-retaining disk with tubes attached to the bores.

While a flange 30 is generally depicted in the previous figures, the assembly can be mounted by any means for mounting the tubular body to the vessel at the opening in the vessel that is traditional in the art. The sensors 90 can be attached to the pressure-retaining disk through traditional means, for example, welding or brazing to the disk. Alternately, tube means 38 can extend from the bores of the disk, as shown in FIG. 6, through which the sensors 90 are inserted. The sensors 90 are then connected to the tube means 38 which allows for any welding, heating or gluing activity to occur at a distance from the closely-spaced sensors at the disk surface.

The current invention allows for a higher pressure rating in the primary chamber by minimizing the amount of space required for the overall assembly and simplifying the manufacture of such assembly. In one embodiment, the pressure-retaining disk of the invention acts as a secondary seal chamber within the disk thus allowing the higher pressure rating by eliminating pipe as the limiting factor. The welds on the inside surface or front face of the disk can act as primary seals, while the welds on the outer surface or back face of the disk acts as secondary seals. The pressure-retaining disk, such as that shown in FIGS. 2 and 3, allow for venting and pressure monitoring as well. A preferred embodiment includes angling the passage in the disk such that the passage is non-perpendicular to the bores which the passage connects, such as shown in FIG. 3.

The invention includes a method of manufacturing the pressure-retaining disk including the steps of positioning or passing the sensors 90 through at least some bores 14 of the multi-bored disk 12 such that the sensors 90 extended beyond the disk. The disk 12 includes passage 16 between bores. The method also includes connecting the sensors to the disk. In the event that tube means are used, such tubes means can be sheaths that pass through the disk or tubes extending from the surfaces of the disk that act as an integral part of the disk. Tube means includes open-ended tubes within the bores that receive the sensors. Other configurations of tube means are also included. The sensors, or other temperature measuring devices, pass through the disk and the vessel opening such that the first end of the temperature measuring devices 90 extend to a desired measuring point in the vessel.

The pressure-disk of the current invention allows for the testing of all the welds of the sensor to the disk at once instead of testing them individually. This is one of the advantages achieved by the formation of the network. In that pressure tests are conducted at extremely high pressure, minimization of such pressure tests reduces operational costs and increases safety.

This invention provides a method of introducing a plurality of sensors, such as temperature measuring devices, into a pressure vessel in a space- and cost-effective manner. This invention is useful for any type of sensor or transducer that is to be used in conjunction with a vessel. For example, the use of fiber optics as a sensor is encompassed within the general scope of the invention. The disk of the invention can be used with a wide variety of apparatus configurations, including those that incorporate concentric reducers. While several embodiments have been described and illustrated, it will be understood that the invention is not limited thereto since many modifications may be made and equivalent structures will become apparent to those skilled in the art to which the invention pertains.

What is claimed is:

1. A sealing device for use with a sensor assembly having a plurality of sensors, said sealing device comprising:

a pressure-retaining disk having a plurality of sensor-receiving bores therethrough, the sensor-receiving bores operable to receive the plurality of sensors;

said bores being interconnected by a passage, the passage being non-perpendicular to the bores which the passage connects; and said bores and passage together forming a network.

2. The sealing device of claim 1 wherein the pressure-retaining disk has an outer surface, said outer surface being unexposed to the pressure of the vessel, the pressure-retaining disk further comprising:

an aperture between the network and the outer surface of the pressure-retaining disk.

3. The sealing device of claim 1 further comprising tube means fixed to at least a plurality of said sensor-receiving bores.

4. An apparatus for sealingly closing an entry to a pressure vessel wherein said pressure vessel includes a sensor assembly, said assembly including a plurality of sensors at least partially inserted within the vessel through an opening, the apparatus comprising:

a pressure-retaining disk having a plurality of sensor-receiving bores therethrough, said bores being interconnected by a passage, the passage in the disk being non-perpendicular to the bores which the passage connects, said bores and passage together forming a network, said sensors passing through the bores; and means for mounting the pressure-retaining disk to the vessel at the opening in the vessel.

5. The apparatus of 4 wherein the means for mounting the disk comprises:

fastener means located at the opening to the vessel; and, a tubular body having an opening through which the plurality of sensors are introduced into the vessel, the tubular body being connecting between the disk and the fastener means.

6. The apparatus of claim 4 wherein the disk has an outer surface, said outer surface being unexposed to the pressure of the vessel, the disk further comprising:

an aperture between the network and the outer surface of the pressure-retaining disk.

7. The apparatus of claim 4 wherein the disk further comprises tube means fixed to the disk aligning with at least a plurality of said sensor-receiving bores.

8. The apparatus of claim 4 wherein said mounting means includes a flange secured to said vessel, the flange including a circle of bolt holes compatible with a like circle of holes carried by a nozzle of the vessel, the nozzle providing the opening in the vessel.

9. An apparatus for introducing a plurality of sensors into a pressure vessel through an opening therein, said apparatus comprising:

a pressure-retaining disk, said pressure-retaining disk having a plurality of bores therethrough, said bores being interconnected by a passage, the passage being non-perpendicular to the bores which the passage connects, said bores and passage together forming a network, said sensors passing through the bores; and means for mounting said disk to the vessel at the opening in the vessel such that pressure is retained.

10. The apparatus of claim 9, wherein the means for mounting the disk comprises:

fastener means located at the opening to the vessel; and, a tubular body having an opening through which the plurality of sensors are introduced into the vessel, the tubular body being connecting between the disk and the fastener means.

11. The apparatus of claim 9 wherein the pressure-retaining disk has an outer surface, said outer surface being unexposed to the pressure of the vessel, the pressure-retaining disk further comprising:

an aperture between the network and the outer surface of the pressure-retaining disk.

12. The apparatus of claim 9 wherein the sensors are temperature measuring devices.

13. A method of manufacturing a pressure-retaining disk comprising the steps of:

positioning sensors through at least some bores of a multi-bored disk such that the sensors extend beyond the disk, said disk including a passage between bores, the passage being non-perpendicular to the bores which the passage connects;

connecting the sensors to the disk.

14. The method of claim 13 wherein the disk further comprises open-ended tubes connected to the disk generally aligned with the bores such that the sensors pass through the tubes.

15. A method for introducing a plurality of sensors into a pressure vessel, the method comprising the steps of:

passing sensors through a pressure-retaining disk, said pressure-retaining disk defining a plurality of sensor-receiving bores, said bores being connected by a passage, the passage being non-perpendicular to the bores which the passage connects;

connecting the pressure-retaining disk to an opening into the vessel through a mounting means; and positioning the sensors within the vessel.

16. The method of claim 15 further comprising the steps of passing said sensors through a primary chamber-forming tubular section located between the pressure-retaining disk and the opening of the vessel.

* * * * *